Patented Aug. 11, 1953

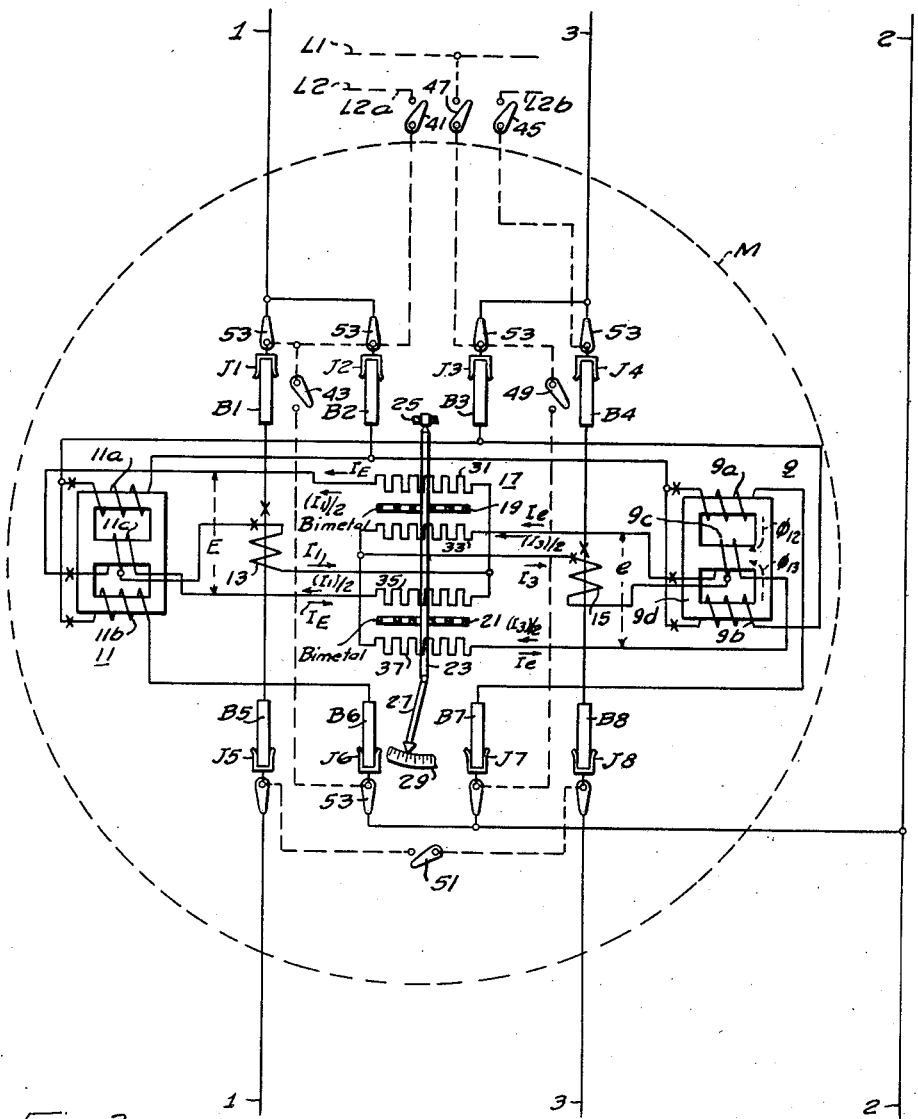

2,648,821

UNITED STATES PATENT OFFICE 2,648,821

VAR MEASURING DEVICE

Ambrose J. Petzinger, Fair Lawn, N. J., assignor to Westinghouse Electric Corporation, East Pittsburgh, Pa., a corporation of Pennsylvania Application January 29, 1948, Serial No. 5,118

10 Claims. (Cl. 324—74)

This invention relates to phase-shifting devices, and it has particular relation to var meters including phase-shifting devices for supplying suitable voltages thereto.

Although the invention is applicable to circuits operating at various frequencies and having various configurations, it will be described with reference to a three-phase three-wire system operating at a frequency of sixty cycles per second. The invention is suitable for var meters employing various conventional movements, such as electrodynamic, induction or thermal movements, and the meters may be designed as indicating, integrating or recording meters. The invention will be discussed with particular reference to var meters employing thermal movements.

In accordance with the invention, a three-winding transformer is employed as a phase shifter. The transformer includes two primary windings which are connected for energization in accordance with separate line voltages of a three-phase three-wire circuit. The secondary winding of the transformer is responsive to the vector sum of the magnetic fluxes produced by the two primary windings. By properly connecting the primary windings, the voltage derived from the secondary winding is in quadrature with one of the voltages of the associated three-phase circuit. Consequently, the output of the secondary winding may be applied to the voltage terminals of a thermal meter which is employed for measuring the reactive power of the three-phase circuit. In order to obtain a complete measurement of reactive power, two phase shifters may be employed for energizing the voltage terminals of a two-element polyphase meter. In addition, current transformers may be required for energizing the current terminals of the meter.

It should be noted that a thermal meter presents a fixed resistance load to the transformers. By properly selecting the ratio of primary leakage reactance to primary resistance of the transformers, it is possible to substantially eliminate phase displacement error in the voltage transformers. Furthermore, the aforesaid ratio may be selected for compensating for phase displacement errors in the current transformers.

The invention also contemplates the testing of a polyphase meter. In a specific embodiment of the invention, two elements of a polyphase meter are connected for energization from a single-phase circuit for test purposes.

It is, therefore, an object of the invention to provide an improved phase shifting device.

It is a further object of the invention to provide a phase-shifting device in the form of a transformer having two primary windings associated with a common secondary winding.

It is also an object of the invention to provide a measuring device including a thermal watt-responsive meter energized in part through a phase-shifting device of the type set forth in the preceding two paragraphs.

It is an additional object of the invention to provide a transformer having a fixed resistance load wherein phase displacement error is substantially eliminated.

It is another object of the invention to provide an improved system for energizing a polyphase measuring device from a single-phase source of electrical energy for test purposes.

Other objects of the invention will be apparent from the following description taken in conjunction with the accompanying drawing, in which:

Figure 1 is a schematic view of a measuring device embodying the invention, and

Figs. 2 and 3 are vector diagrams showing voltage and current relationships suitable for the measuring device of Fig. 1.

The specific measuring device herein described is designed for the measurement of the reactive power of a three-phase three-wire electrical circuit. The device is accurate provided that the phase voltages of the three-phase circuit always remain equal in magnitude and balanced or symmetrical with respect to phase. However, it should be pointed out that all conventional reactive power measuring devices depend to the same extent on these assumptions. As a matter of fact, the variations in magnitude and balance of the phase voltages of modern electrical distribution systems are so small that the accuracies of the reactive power measuring devices are well within acceptable limits.

Referring to the drawing, Fig. 1 shows a measuring device M which may be located in a conventional detachable meter casing having eight terminals in the form of contact blades B1, B2, B3, B4, B5, B6, B7 and B8. Such casings are well known in the art and may be similar to the casing illustrated in Fig. 10 of Catalog Section 42–210, published by the Westinghouse Electric Corporation of East Pittsburgh, Pa., November 17, 1941. The contact blades of the meter casing are designed for reception in the contact jaws of a conventional meter socket, such as that illustrated in Fig. 17 of the aforesaid catalog section. See also Patent 2,297,833. The contact jaws of a suitable socket are represented in Fig. 1 by contact jaws J1 to J8, inclusive.

It will be understood that external circuits applying energy to the measuring device are connected to the contact jaws. For example, in Fig. 1, the measuring device is to be energized from a three-phase three-wire circuit represented by phase conductors 1, 2 and 3. The phase conductor 1 is interrupted and has one portion connected to the contact jaws J1 and J2, whereas the remaining portion is connected to the contact jaw J5. Similarly, the phase conductor 3 is interrupted and one portion is connected to the contact jaws J3 and J4, whereas the remaining portion is connected to the contact jaw J8. The phase conductor 2 is connected to the contact jaws J6 and J7.

The measuring device M is intended to measure the reactive power of the associated polyphase circuit. In discussing the invention, a conventional system of notation will be employed. Currents derived from the phase conductors 1, 2 and 3 are identified, respectively as currents $I_1$, $I_2$ and $I_3$. The voltage between the phase conductors is represented by the symbol E accompanied by a subscript formed by the numerals of the phase conductors between which the voltage is taken. For example, the voltage $E_{21}$ represents the voltage between the phase conductors 2 and 1. A reversal of the numerals in the subscript indicates a reversal in phase of the voltage represented thereby. As shown in Fig. 2, by an arrow A a conventional counterclockwise rotation of the vectors representing the three phase voltages is assumed and the phase conductors have been numbered in accordance with such phase rotation.

From Blondel's theorem the instantaneous real power P of the three-phase circuit may be represented by the following expression:

$$P = I_1 E_{12} + I_3 E_{32} \qquad (1)$$

The instantaneous reactive power of the circuit may be obtained by rotating the voltages in Equation 1 through an angle of 90°, as represented by the following expression:

$$Q = I_1(\pm j) E_{12} + I_3(\pm j) E_{32} \qquad (2)$$

The conventional vector operator $j$ indicates a rotation of the associated voltage through an angle of 90°. This rotation is in a counterclockwise direction (represented by $+j$) or in a clockwise direction (represented by the operator $-j$) depending on whether leading or lagging reactive power is to be measured. In most cases, the measuring device would be designed for measuring lagging reactive power.

From Equations 1 and 2, it will be observed that in order to measure reactive power a voltage $-jE_{32}$ is desired which is in quadrature with the line voltage $E_{32}$. The desired voltage is obtained from a phase-shifting device 9 which is in the form of a three-winding transformer having two primary windings 9a and 9b and a common secondary winding 9c. The three windings surround, respectively, the three legs of a magnetic core 9d which has a "figure of 8" shape. The primary winding 9a is connected across the contact blades B2 and B7 for energization in accordance with the voltage $E_{12}$. The primary winding 9b is connected across the contact blades B2 and B3 for energization in accordance with the voltage $E_{13}$. When energized, the windings 9a and 9b produce magnetic fluxes $\phi_{12}$ and $\phi_{13}$. As shown by dotted arrows in Fig. 1, the vector sum of these fluxes passes through the secondary winding 9c and induces in the secondary winding a voltage proportional to the vector sum of the voltages $E_{12}$ and $E_{13}$. These voltage relationships are illustrated in Fig. 2, wherein the voltage $E_{12}$ and the voltage $E_{13}$ are vectorially added to provide a resultant voltage $e$. It will be observed that the resultant voltage $e$ is in quadrature with the voltage $E_{32}$, and consequently may be employed as one of the voltages in Equation 2. It will be understood that the polarities of energization of the windings are selected to provide the desired vector addition.

In a somewhat similar manner, a phase-shifting device 11 is employed to supply a voltage in quadrature with the voltage $E_{12}$. The polarities are selected to provide an induced voltage E in the secondary winding 11c which is equal to the vector sum of the voltages $E_{31}$ and $E_{32}$. Consequently, as shown in Fig. 2, the resultant voltage E is in quadrature with the voltage $E_{12}$ and may be employed as another of the voltages required for Equation 2. In addition, the currents $I_1$ and $I_3$ may be derived from the conductors 1 and 3 in any suitable manner as through current transformers 13 and 15.

The instantaneous reactive power of the three-phase circuit is represented by the expression $$Q = k(EI_1 + eI_3) \qquad (3)$$

In this expression $k$ is a constant. For the vector relations of Fig. 2, $k$ may be equal to $1\sqrt{3}$. It will be understood that the current $I_1$ and the voltage E may be applied to a watt responsive device for measuring the quantity $EI_1$. Also the voltage and the current $I_3$ may be supplied to any conventional watt responsive device for measuring the quantity $eI_3$. By adding the two measurements the desired reactive power Q is obtained. Alternatively the voltages and currents may be applied to the voltage and current terminals of any conventional two-element watt responsive device for measuring directly the reactive power Q.

In Fig. 1, a two-element watt responsive thermal meter 17 is provided. This meter includes two spiral bimetallic springs 19 and 21 which have their inner ends connected to a shaft 23. The shaft is mounted for rotation with respect to a supporting structure 25 to move a pointer 27 across a suitable scale 29. The springs 19 and 21 have their outer ends secured to a supporting structure and are oppositely wound with respect to the shaft 23. Consequently, the pointer 27 is actuated in accordance with the difference in temperatures of the two bimetallic springs.

The temperatures of the bimetallic springs are controlled by four resistance heaters. Two of the heaters 31 and 33 are positioned to supply heat to the bimetallic spring 19. The remaining heaters 35 and 37 are positioned to supply heat to the bimetallic spring 21. Such a thermal meter is well known in the prior art, typical constructions therefor being shown in the Lincoln et al. Patent 1,300,283 and in the Vassar Patent 2,323,738.

The heaters 31 and 35 are connected in series across the terminals of the secondary winding 11c for energization in accordance with the voltage E. The secondary winding of the current transformer 13 has one terminal connected to a center tap on the winding 11c and a second terminal connected to the right-hand ends of the heaters 31 and 35, as viewed in Fig. 1. Consequently, the heaters 31 and 35 in effect are connected in parallel across the secondary winding of the current transformer 13. As an example of suitable current and voltage relationships the heater 31 may be energized in accordance with the vector sum $$\left(I_E + \frac{I_1}{2}\right)$$

and the heater 35 may be energized in accordance with the vector difference $$\left(I_E - \frac{I_1}{2}\right)$$

The current $I_E$ is that supplied by the secondary winding 11c, whereas the current $I_1$ is that supplied by the secondary winding of the transformer 13.

In a somewhat analogous manner the heaters 33 and 37 are connected in series across the secondary winding 9c for energization in accordance with the current $I_2$. The heaters 33 and 37 also are connected in parallel across the secondary winding of the current transformer 15 for energization by the current $$\left(\frac{I_3}{2}\right)$$

The connections are such that the heater 33 is energized in accordance with the vector sum $$\left(I_e + \frac{I_3}{2}\right)$$

whereas the heater 37 is energized in accordance with the vector difference $$\left(I_e - \frac{I_3}{2}\right)$$

When so connected the pointer 27 will indicate on the scale 29 the reactive power of the associated three-phase circuit.

It is convenient to test a meter of the type illustrated in Fig. 1 from a source of single-phase energy which is represented in Fig. 1 by conductors L1 and L2. The terminals or contact blades provided by applicant facilitates such testing. The conductor L2 is divided into two portions L2a and L2b. The portion L2a is connected to the contact jaws J1, J2 and J6 through suitable switches 41 and 43. The portion L2b is connected to the contact jaw J4 through a suitable switch 45. The conductor L1 is connected through a switch 47 to the contact jaw J3 and through a switch 49 to the contact jaw J7. In addition, a switch 51 is provided for connecting the contact jaws J5 and J8. In addition suitable disconnect switches 53 are provided for disconnecting the phase conductors 1, 2 and 3 from the contact jaws. It will be understood that instead of employing a single socket for the connections to the three-phase circuit and for the connections to the single-phase circuit, a separate test socket may be employed which is permanently connected to the single-phase circuit through the circuits illustrated in dotted lines in Fig. 1. The measuring device then would be inserted in the auxiliary test socket for test purposes. However, for convenience in illustration, a single socket is assumed to be employed for both circuits.

In order to test the measuring device, the disconnects 53 would be open and the switches 41, 43, 45, 47, 49 and 51 would be closed. This connects the primaries of the current transformers 13 and 15 in series for energization in accordance with the current supplied from a source to a load by the conductors L1 and L2. In addition, all of the primary windings 9a, 9b, 11a and 11b are connected in parallel across the conductors L1 and L2. The polarities are such that the secondary winding 9c has a voltage induced therein which is proportional to the sum of the voltages across the windings 9a and 9b. A similar voltage is induced in the secondary winding 11c. In effect, the thermal meter 17 is divided into two single-phase elements which are connected to the single-phase circuit represented by the conductors L1 and L2.

It will be noted that only eight terminals or contact blades are required to provide the desired test facilities. This is advantageous for the reason that eight contact jaws and eight contact blades are the maximum number in one available style of detachable casing and socket units.

It is well understood in the art that transformers are subject to phase displacement errors. By following the principles hereinafter set forth, it is possible to eliminate almost completely the inaccuracies resulting from such phase displacement errors.

As shown in Fig. 3, the primary voltage $V_P$ applied to the primary winding of a transformer is equal to the sum of the induced primary voltage $E_P$ and the voltage drops due to the primary resistance $R_P$ and the primary leakage reactance $X_L$. The primary current $I_P$ may be divided into an exciting current and a load current $I_L$. Inasmuch as the load represented by the heaters of a thermal meter is a resistive load, the load current $I_L$ is substantially in phase with the induced voltage $E_P$ and is so represented in Fig. 3. The exciting current comprises a magnetizing component $I_O$ in quadrature with the induced voltage $E_P$ and a loss component in phase with the induced voltage $E_P$ and load current $I_L$. Since in a well designed transformer the loss component is extremely small compared to the load current $I_L$, only the magnetizing component of the exciting current $I_O$ is shown in quadrature with the induced voltage $E_P$ in Fig. 3.

The load current $I_L$ in traversing the leakage reactance of the transformer primary produces a voltage drop $I_L X_L$ which leads the load current $I_L$ by 90°. The exciting current component $I_O$ in traversing the primary resistance $R_P$ produces a voltage drop $I_O R_P$ which is in phase with the exciting current. By inspection of Fig. 3, it will be observed that the drops $I_L X_L$ and $I_O R_P$ are substantially in phase opposition. Consequently, by proper selection of the ratio of the resistance $R_P$ to the leakage reactance $X_L$, it is possible to make the sum of these two voltage drops zero. The load current and the exciting current in traversing respectively the primary resistance and the primary leakage reactance produce additional voltage drops $I_L R_P$ and $I_O X_L$. However, these last two voltage drops are substantially in phase with the induced voltage $E_P$. Consequently, the sum $V_P$ of the induced voltage $E_P$ and the various voltage drops is in phase with the induced voltage $E_P$.

If desired, the ratio of the primary resistance to the primary leakage reactance may be selected to compensate at least in part for other errors. For example, the current transformers 13 and 15 of Fig. 1 may have phase displacement errors. If these phase displacement errors are substantially constant over the load range of the current transformers, the phase displacement errors of the transformers 9 and 11 may be adjusted to compensate for the phase displacement errors of the current transformers. If the phase displacement errors of the current transformers vary over the load range thereof, the compensation introduced by the voltage transformers 9 and 11 may be made equal to the average of the phase displacement errors introduced by the current transformers. In other words, the primary leakage reactance and primary resistance of the transformer 11 may be selected to maintain substantially the phase displacement between the secondary voltage of the voltage transformer and the secondary current of the current transformer 13 that exists between the resultant primary voltage and primary current of these transformers.

The required adjustment for the voltage transformer may be understood by reference to Fig. 3. By increasing the magnitude of the primary resistance $R_P$, the voltage drop $I_0R_P$ may be increased to make the resultant voltage $V_P$ lag the induced voltage $E_P$. The same result may be achieved by decreasing the primary leakage reactance. By decreasing the primary resistance or increasing the primary leakage reactance, or both, the resultant voltage $V_P$ may be made to lead the induced voltage $E_P$. In this way, the phase displacement between the voltage $V_P$ and the load current $I_L$ may be controlled.

The adjustment of the primary resistance and leakage reactance may be effected in various ways. To change the primary resistance the material employed in the primary winding may be selected to provide the desired resistance values. Alternatively, the resistance of the leads to the terminals of the primary windings may be selected to have the proper values or adjustable resistors may be connected in series therewith. The leakage reactance also may be adjusted in various known ways as by varying the number of turns in the windings.

It will be observed that the transformers 9 and 11 not only serve as phase shifting transformers but also may operate as ratio transformers. The ratio of the number of turns in the secondary windings 9c and 11c relative to the primary turns may be varied to produce the desired magnitude of output voltages $e$ and $E$. Preferably the turns, leakage reactances and primary resistances of the pair of primary windings employed in each of the transformers 9 and 11 should be kept equal.

Although the invention has been described with reference to certain specific embodiments thereof, numerous modifications falling within the spirit and scope of the invention are possible.

I claim as my invention:

1. In an electrical device, a three-phase circuit having three phase conductors, a transformer device having a secondary winding and having two primary windings effective when energized for inducing a voltage in the secondary winding substantially proportional to the vector sum of the energizations of the primary windings, means connecting the primary windings for energization respectively in accordance with the voltages between separate pairs of said phase conductors for inducing a voltage in the secondary winding substantially in quadrature with the voltage between the remaining pair of said phase conductors, translating means responsive to two alternating quantities and the vector relationship therebetween, and means connecting the translating means for a first energization from said secondary winding and a second energization from the three-phase circuit.

2. A device as claimed in claim 1 wherein the translating means comprises a thermal watt-meter connected to receive a voltage input from the secondary winding and a current input from one of said phase conductors.

3. In an electrical device, a three-phase circuit having three phase conductors 1, 2 and 3 for carrying phase currents $I_1$, $I_2$ and $I_3$, and having when energized voltages $E_{13}$, $E_{32}$ and $E_{21}$ between the conductors represented by the voltage subscripts, a first transformer device comprising a magnetic core having three legs magnetically in parallel, a pair of primary windings respectively on two of said legs, and a secondary winding disposed on the third leg of the magnetic core, means connecting the primary windings for energization respectively in accordance with the voltages $E_{13}$ and $E_{21}$ to induce in the secondary winding a voltage in quadrature with the voltage $E_{32}$.

4. In an electrical device, a three-phase circuit having three phase conductors 1, 2 and 3 for carrying phase currents $I_1$, $I_2$ and $I_3$ numbered in the order of phase rotation, and having when energized voltages $E_{13}$, $E_{32}$ and $E_{21}$ between the conductors represented by the voltage subscripts, first and second transformer devices each comprising a pair of primary windings, a secondary winding and a magnetic core separately coupling the secondary winding to each of the primary windings, means connecting the primary windings of the first transformer for energization respectively in accordance with the voltages $E_{13}$ and $E_{21}$ to induce in the associated secondary winding a first voltage in quadrature with the voltage $E_{32}$, means connecting the primary windings of the second transformer device for energization respectively in accordance with the voltages $E_{32}$ and $E_{31}$ to induce in the associated secondary winding a second voltage in quadrature with the voltage $E_{21}$, and watt-responsive translating means connected for energization from the secondary windings and the three-phase circuit in accordance with the first and second voltages and the currents $I_1$ and $I_3$.

5. A device as claimed in claim 4 wherein the translating means comprises a polyphase thermal watt-responsive meter having first heaters connected for energization from the first voltage and the current $I_1$ and having second heaters connected for energization from the second voltage and the current $I_3$ to produce a meter output representing the reactive volt-amperes of the three-phase circuit.

6. In an electrical device, a three-phase circuit having three phase conductors 1, 2 and 3 for carrying phase currents $I_1$, $I_2$ and $I_3$, and having when energized voltages $E_{13}$, $E_{32}$ and $E_{21}$ between the conductors represented by the voltage subscripts, a first transformer device comprising a magnetic core having three legs magnetically in parallel, a pair of primary windings respectively on two of said legs, and a secondary winding disposed on the third leg of the magnetic core, means connecting the primary windings for energization respectively in accordance with the voltages $E_{13}$ and $E_{21}$ to induce in the secondary winding a voltage in quadrature with the voltage $E_{32}$, and means for connecting the primary windings for energization from a pair of terminals in accordance with a single-phase voltage.

7. A device as claimed in claim 4, in combination, with means selectively operable for connecting the primary windings to a pair of conductors energizing all of the primary windings in accordance with a single-phase voltage, and selectively operable means for connecting the translating means to replace the currents $I_1$ and $I_3$ by a common single-phase current.

8. In an electrical device, a voltage transformer having primary winding means designed for energization at a rated input voltage, a current transformer having a phase displacement error, and translating means having separate inputs from said transformers, said translating means being responsive to the phase displacement between the outputs of the transformers, said translating means presenting substantially a fixed resistance load to said transformers, said voltage transformer having a primary leakage reactance and a primary resistance selected to make the magnitude of the voltage drop resulting from load current flowing through the leakage reactance different from the magnitude of the voltage drop resulting from the exciting current of the voltage transformer flowing through the primary resistance by an amount sufficient to compensate the translating means for the error introduced by said phase displacement error.

9. In an electrical device, a voltage transformer having primary winding means designed for energization at a rated input voltage, and a substantially fixed resistance load for the transformer, said transformer having a primary leakage reactance and a primary resistance selected to make the magnitude of the voltage drops resulting from load current flowing through the leakage reactance substantially equal to the magnitude of the voltage drop resulting from the exciting current of the transformer flowing through said primary resistance.

10. In an electrical device, a three-phase circuit having three phase conductors, a transformer device having a secondary winding and having two primary windings effective when energized for inducing a voltage in the secondary winding substantially proportional to the vector sum of the energizations of the primary windings, means connecting the primary windings for energization respectively in accordance with the voltages between separate pairs of said phase conductors for inducing a voltage in the secondary winding substantially in quadrature with the voltage between the remaining pair of said phase conductors, translating means responsive to two alternating quantities and the vector relationship therebetween, and means connecting the translating means for a first energization from said secondary winding and a second energization from the three-phase circuit, said translating means comprising a thermal wattmeter connected to receive a voltage input from the secondary winding and a current input from one of said phase conductors, and said transformer device comprising a primary leakage reactance and a primary resistance selected to make the magnitude of the voltage drop resulting from load current flowing through the leakage reactance substantially equal to the magnitude of the voltage drop resulting from the exciting current of the transformer flowing through said primary resistance.

AMBROSE J. PETZINGER.

References Cited in the file of this patent

UNITED STATES PATENTS

| Number | Name | Date |
|---|---|---|
| 920,652 | Ricketts | May 4, 1909 |
| 1,399,968 | Knopp | Dec. 13, 1921 |
| 1,944,656 | Downing | Jan. 23, 1934 |
| 1,953,519 | Tritschler | Apr. 3, 1934 |
| 1,971,207 | Boyajian | Aug. 21, 1934 |
| 2,068,575 | Stark | Jan. 19, 1937 |
| 2,121,592 | Gough | June 21, 1938 |
| 2,243,162 | Lee | May 27, 1941 |
| 2,358,725 | Mauerer | Sept. 19, 1944 |
| 2,424,596 | Weber | July 29, 1947 |
| 2,454,201 | Petzinger et al. | Nov. 16, 1948 |
| 2,495,158 | Carlin | Jan. 17, 1950 |

FOREIGN PATENTS

| Number | Country | Date |
|---|---|---|
| 111,837 | Great Britain | Jan. 31, 1918 |